(12) United States Patent
Stell et al.

(10) Patent No.: US 7,311,746 B2
(45) Date of Patent: Dec. 25, 2007

(54) VAPOR/LIQUID SEPARATION APPARATUS FOR USE IN CRACKING HYDROCARBON FEEDSTOCK CONTAINING RESID

(75) Inventors: Richard C. Stell, Houston, TX (US); Arthur R. Di Nicolantonio, Seabrook, TX (US); George Stephens, Humble, TX (US); James M. Frye, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 524 days.

(21) Appl. No.: 10/851,434

(22) Filed: May 21, 2004

(65) Prior Publication Data

US 2005/0261530 A1    Nov. 24, 2005

(51) Int. Cl.
*B01D 45/12* (2006.01)
(52) U.S. Cl. .................. 55/419; 55/426; 55/428; 55/459.1; 55/466
(58) Field of Classification Search .......... 55/419, 55/424, 426, 428, 432, 466, 459.1; 422/198
See application file for complete search history.

(56) References Cited

U.S. PATENT DOCUMENTS

| | | | |
|---|---|---|---|
| 1,936,699 A | 11/1933 | Weaver | |
| 1,984,569 A | 12/1934 | Cooke et al. | 196/66 |
| 2,091,261 A | 8/1937 | Alther | 196/49 |
| 2,158,425 A | 5/1939 | Ragatz | 196/73 |
| 3,291,573 A | 12/1966 | Frescoln | |
| 3,341,429 A | 9/1967 | Fondrk | |
| 3,413,211 A | 11/1968 | Becraft et al. | 208/93 |
| 3,487,006 A | 12/1969 | Newman et al. | 208/93 |
| 3,492,795 A | 2/1970 | Guerrieri | |
| 3,505,210 A | 4/1970 | Wallace et al. | |
| 3,617,493 A | 11/1971 | Wirth et al. | 208/80 |
| 3,677,234 A | 7/1972 | Dutkiewicz | |
| 3,718,709 A | 2/1973 | Simonetta | 260/683 R |

(Continued)

FOREIGN PATENT DOCUMENTS

DE    10 93 351    11/1960

(Continued)

OTHER PUBLICATIONS

Dennis A. Duncan and Vance A. Ham, Stone & Webster, "The Practicalities of Steam-Cracking Heavy Oil", Mar. 29-Apr. 2, 1992, AIChE Spring National Meeting in New Orleans, LA, pp. 1-41.

(Continued)

*Primary Examiner*—Robert A. Hopkins (57) ABSTRACT

A highly efficient vapor/liquid separation apparatus for treating a flow of vapor/liquid mixtures of hydrocarbons and steam comprises a substantially cylindrical vertical drum having an upper cap section, a middle section comprising a circular wall, a lower cap section, a tangential inlet to introduce hydrocarbon/steam mixtures, an overhead vapor outlet, and a bottom outlet for liquid. The vessel also comprises an annular structure located in the middle section, comprising i) an annular ceiling section extending from the circular wall and ii) a concentric internal vertical side wall to which the ceiling section extends. The annular structure blocks upward passage of vapor/liquid mixtures along the circular wall beyond the ceiling section, and surrounds an open core having sufficient cross-sectional area to permit vapor velocity low enough to avoid significant entrainment of liquid.

34 Claims, 5 Drawing Sheets

U.S. PATENT DOCUMENTS

| | | | |
|---|---|---|---|
| 3,877,904 A * | 4/1975 | Lowrie | 96/189 |
| 3,900,300 A | 8/1975 | Lehman | |
| 4,015,960 A * | 4/1977 | Nutter | 55/355 |
| 4,149,861 A * | 4/1979 | Sogo et al. | 96/372 |
| 4,199,409 A | 4/1980 | Skraba | |
| 4,264,432 A | 4/1981 | Gartside | 208/48 R |
| 4,300,998 A | 11/1981 | Gartside | 208/127 |
| 4,311,580 A | 1/1982 | Bartholic | 208/91 |
| 4,361,478 A | 11/1982 | Gengler et al. | |
| 4,400,182 A | 8/1983 | Davies et al. | |
| 4,426,278 A | 1/1984 | Kosters | 208/130 |
| 4,543,177 A | 9/1985 | Murthy et al. | 208/130 |
| 4,615,795 A | 10/1986 | Woebcke et al. | 208/72 |
| 4,714,109 A | 12/1987 | Tsao | |
| 4,732,740 A | 3/1988 | Woebcke et al. | 422/193 |
| 4,840,725 A | 6/1989 | Paspek | 208/130 |
| 4,854,944 A | 8/1989 | Strong | 48/214 R |
| 4,954,247 A | 9/1990 | Lipkin et al. | |
| 5,096,567 A | 3/1992 | Paspek, Jr. et al. | 208/106 |
| 5,120,892 A | 6/1992 | Skraba | 585/652 |
| 5,141,906 A | 8/1992 | Takeshima et al. | |
| 5,190,634 A | 3/1993 | Fernandez-Baujin et al. | 208/107 |
| 5,468,367 A | 11/1995 | Dickakian et al. | |
| 5,580,443 A | 12/1996 | Yoshida et al. | 208/130 |
| 5,817,226 A | 10/1998 | Lenglet | |
| 5,910,440 A | 6/1999 | Grossman et al. | |
| 6,093,310 A | 7/2000 | Swan | |
| 6,123,830 A | 9/2000 | Gupta et al. | |
| 6,179,997 B1 | 1/2001 | Vedder, Jr. et al. | 208/113 |
| 6,190,533 B1 | 2/2001 | Bradow et al. | |
| 6,210,561 B1 | 4/2001 | Bradow et al. | |
| 6,303,842 B1 | 10/2001 | Bridges et al. | |
| 6,376,732 B1 | 4/2002 | Ngan et al. | |
| 6,599,348 B2 * | 7/2003 | Chosnek et al. | 95/271 |
| 6,632,351 B1 | 10/2003 | Ngan et al. | 208/132 |
| 6,743,961 B2 | 6/2004 | Powers | |
| 2001/0016673 A1 | 8/2001 | Bridges et al. | |
| 2003/0070963 A1 | 4/2003 | Zimmermann et al. | |
| 2004/0004022 A1 | 1/2004 | Stell et al. | 208/106 |
| 2004/0004027 A1 | 1/2004 | Spicer et al. | 208/130 |
| 2004/0004028 A1 | 1/2004 | Stell et al. | 208/130 |
| 2004/0039240 A1 | 2/2004 | Powers | |
| 2004/0054247 A1 | 3/2004 | Powers | |
| 2005/0010075 A1 | 1/2005 | Powers | |

FOREIGN PATENT DOCUMENTS

| | | |
|---|---|---|
| EP | 0063448 | 10/1982 |
| FR | 1472280 | 3/1967 |
| GB | 199 766 | 6/1923 |
| GB | 998 504 | 7/1965 |
| GB | 1 053 751 | 1/1967 |
| GB | 1 203 017 | 8/1970 |
| GB | 1 233 795 | 5/1971 |
| GB | 2 006 259 | 10/1977 |
| GB | 2 012 176 | 11/1977 |
| NL | 7410163 | 4/1975 |
| SU | 1491552 | 7/1989 |
| WO | WO 01/55280 | 8/2001 |
| WO | WO 2004/005433 | 1/2004 |
| ZA | 907394 | 7/1991 |

OTHER PUBLICATIONS

ABB Lummus Crest Inc., (presentation) HOPS, "Heavy Oil Processing System", Jun. 15, 1992 TCC PEW Meeting, pp. 1-18.

Mitsui Sekka Engineering Co., Ltd./Mitsui Engineering & Shipbuilding Co., Ltd., "Mitsui Advanced Cracker & Mitsui Innovative Quencher", pp. 1-16.

"Specialty Furnace Design: Steam Reformers and Steam Crackers", presented by T.A. Wells of the M.W. Kellogg Company, 1988 AIChE Spring National Meeting.

* cited by examiner

VAPOR/LIQUID SEPARATION APPARATUS FOR USE IN CRACKING HYDROCARBON FEEDSTOCK CONTAINING RESID

FIELD OF THE INVENTION

The present invention relates to a vapor/liquid separation apparatus which exhibits great efficiency in removing non-volatile hydrocarbons from hydrocarbon feedstocks.

BACKGROUND

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products, including olefins, leave the pyrolysis furnace for further downstream processing, including quenching.

Conventional steam cracking systems have been effective for cracking high-quality feedstocks such as gas oil and naphtha. However, steam cracking economics sometimes favor cracking low cost heavy feedstock such as, by way of non-limiting examples, crude oil and atmospheric resid, also known as atmospheric pipestill bottoms. Crude oil and atmospheric resid contain high molecular weight, non-volatile components with boiling points in excess of 590° C. (1100° F.). The non-volatile, heavy ends of these feedstocks lay down as coke in the convection section of conventional pyrolysis furnaces. Only very low levels of non-volatiles can be tolerated in the convection section downstream of the point where the lighter components have fully vaporized. Additionally, some naphthas are contaminated with crude oil during transport. Conventional pyrolysis furnaces do not have the flexibility to process resids, crudes, or many resid or crude contaminated gas oils or naphthas, which contain a large fraction of heavy non-volatile hydrocarbons.

The present inventors have recognized that in using a flash to separate heavy non-volatile hydrocarbons from the lighter volatile hydrocarbons which can be cracked in the pyrolysis furnace, it is important to maximize the non-volatile hydrocarbon removal efficiency. Otherwise, heavy, coke-forming non-volatile hydrocarbons could be entrained in the vapor phase and carried overhead into the furnace creating coking problems in the convection section.

Additionally, during transport some naphthas are contaminated with heavy crude oil containing non-volatile components. Conventional pyrolysis furnaces do not have the flexibility to process residues, crudes, or many residue or crude contaminated gas oils or naphthas which are contaminated with non-volatile components.

To address coking problems, U.S. Pat. No. 3,617,493, which is incorporated herein by reference, discloses the use of an external vaporization drum for the crude oil feed and discloses the use of a first flash to remove naphtha as vapor and a second flash to remove vapors with a boiling point between 230 and 590° C. (450 and 1100° F.). The vapors are cracked in the pyrolysis furnace into olefins and the separated liquids from the two flash tanks are removed, stripped with steam, and used as fuel.

U.S. Pat. No. 3,718,709, which is incorporated herein by reference, discloses a process to minimize coke deposition. It describes preheating of heavy feedstock inside or outside a pyrolysis furnace to vaporize about 50% of the heavy feedstock with superheated steam and the removal of the residual, separated liquid. The vaporized hydrocarbons, which contain mostly light volatile hydrocarbons, are subjected to cracking.

U.S. Pat. No. 5,190,634, which is incorporated herein by reference, discloses a process for inhibiting coke formation in a furnace by preheating the feedstock in the presence of a small, critical amount of hydrogen in the convection section. The presence of hydrogen in the convection section inhibits the polymerization reaction of the hydrocarbons thereby inhibiting coke formation.

U.S. Pat. No. 5,580,443, which is incorporated herein by reference, discloses a process wherein the feedstock is first preheated and then withdrawn from a preheater in the convection section of the pyrolysis furnace. This preheated feedstock is then mixed with a predetermined amount of steam (the dilution steam) and is then introduced into a gas-liquid separator to separate and remove a required proportion of the non-volatiles as liquid from the separator. The separated vapor from the gas-liquid separator is returned to the pyrolysis furnace for heating and cracking.

Co-pending U.S. application Ser. No. 10/188,461 filed Jul. 3, 2002, Patent Application Publication US 2004/0004022 A1, published Jan. 8, 2004, which is incorporated herein by reference, describes an advantageously controlled process to optimize the cracking of volatile hydrocarbons contained in the heavy hydrocarbon feedstocks and to reduce and avoid coking problems. It provides a method to maintain a relatively constant ratio of vapor to liquid leaving the flash by maintaining a relatively constant temperature of the stream entering the flash. More specifically, the constant temperature of the flash stream is maintained by automatically adjusting the amount of a fluid stream mixed with the heavy hydrocarbon feedstock prior to the flash. The fluid can be water.

U.S. Patent Application Ser. No. 60/555,282, filed Mar. 22, 2004, which is incorporated herein by reference, describes a process for cracking heavy hydrocarbon feedstock which mixes heavy hydrocarbon feedstock with a fluid, e.g., hydrocarbon or water, to form a mixture stream which is flashed to form a vapor phase and a liquid phase, the vapor phase being subsequently cracked to provide olefins, and the product effluent cooled in a transfer line exchanger, wherein the amount of fluid mixed with the feedstock is varied in accordance with a selected operating parameter of the process, e.g., temperature of the mixture stream before the mixture stream is flashed.

Co-pending U.S. application Ser. No. 10/189,618 filed Jul. 3, 2002, patent application Publication US 2004/0004028 A1, published Jan. 8, 2004, which is incorporated herein by reference, describes an advantageously controlled process to increase the non-volatile removal efficiency in a flash drum in the steam cracking system wherein gas flow from the convection section is converted from mist flow to annular flows before entering the flash drum to increase the removal efficiency by subjecting the gas flow first to an expander and then to bends, forcing the flow to change direction. This coalesces fine liquid droplets from the mist.

It has been found that in the convection section of a steam cracking pyrolysis furnace, a minimum gas flow is required in the piping to achieve good heat transfer and to maintain a film temperature low enough to reduce coking. Typically, a minimum gas flow velocity of about 30 m/sec (100 ft/sec) has been found to be desirable.

When using a vapor/liquid separation apparatus such as a flash drum to separate the lighter volatile hydrocarbon as vapor phase from the heavy non-volatile hydrocarbon as liquid phase, the flash stream entering the flash drum usually comprises a vapor phase with liquid (the non-volatile hydrocarbon components) entrained as fine droplets. Therefore, the flash stream is two-phase flow. At the flow velocities required to maintain the required boundary layer film temperature in the piping inside the convection section, this two-phase flow is in a "mist flow" regime. In this regime, fine droplets comprising non-volatile heavy hydrocarbons are entrained in the vapor phase, which is the volatile hydrocarbons and, optionally, steam. The two-phase mist flow presents operational problems in the flash drum because at these high gas flow velocities the fine droplets comprising non-volatile hydrocarbons do not coalesce and, therefore, cannot be efficiently removed as liquid phase from the flash drum. It was found that, at a gas flow of 30 m/s (100 feet/second) velocity, the flash drum can only remove heavy non-volatile hydrocarbons at a low efficiency, e.g., about 73%.

The present invention provides an apparatus and process for the effective removal of non-volatile hydrocarbon liquid from the volatile hydrocarbon vapor in the flash drum. The present invention provides an apparatus and process that significantly enhance the separation of non-volatile and volatile hydrocarbons in the flash drum.

SUMMARY

In one aspect, the present invention relates to a vapor/liquid separation apparatus for treating a flow of vapor/liquid mixtures of hydrocarbons and steam. The apparatus comprises (a) a substantially cylindrical vertical drum having an upper cap section, a middle section comprising a circular wall, and a lower cap section; (b) an overhead vapor outlet attached to the upper cap section; (c) at least one substantially tangentially positioned inlet in the circular wall of said middle section for introducing said flow along said wall; (d) an annular structure located in the middle section, comprising i) an annular ceiling section extending from the circular wall and ii) an internal vertical side wall to which the ceiling section extends, the side wall being positioned substantially concentrically to, but away from, the circular wall, the annular structure blocking the upward passage of the vapor/liquid mixtures along the circular wall beyond the ceiling section, and the annular structure surrounding an open core having sufficient cross-sectional area to permit vapor velocity low enough to avoid significant entrainment of liquid; and (e) a substantially concentrically positioned, substantially cylindrical boot of less diameter than the middle section, the boot communicating with the lower cap section, and further comprising a liquid outlet at its lower end. In an embodiment, the apparatus further comprises: (f) at least one baffle located at a lower part of the middle section providing a surface slanting downwardly from the center of the drum toward the circular wall and providing a gap between the baffle and the circular wall for directing liquid along or near the circular wall to the lower cap section.

In another aspect, the present invention relates to an apparatus for cracking a hydrocarbon feedstock containing resid, comprising: (a) a heating zone for heating the hydrocarbon feedstock to provide heated hydrocarbon feedstock; (b) a mixing zone for mixing a primary dilution steam stream with the heated hydrocarbon feedstock to provide a heated two-phase stratified open channel flow mixture stream, which may be further heated, e.g., by convection prior to step (c); (c) a vapor/liquid separation zone for treating vapor/liquid mixtures of hydrocarbons and steam, the separation zone comprising: (i) a substantially cylindrical vertical drum having an upper cap section, a middle section comprising a circular wall, and a lower cap section; (ii) an overhead vapor outlet attached to the upper cap section; (iii) at least one substantially tangentially positioned inlet in the wall of the middle section for introducing the flow along the wall; (iv) an annular structure located in the middle section, comprising A) an annular ceiling section extending from the circular wall and B) an internal vertical side wall to which the ceiling section extends, the side wall being positioned substantially concentrically to, but away from, the circular wall, the annular structure blocking the upward passage of the vapor/liquid mixtures along the circular wall beyond the ceiling section, and the annular structure circumscribing an open core having sufficient cross-sectional area to permit vapor velocity low enough to avoid significant entrainment of liquid; and (v) a substantially concentrically positioned, substantially cylindrical boot of less diameter than the middle section, the boot communicating with the lower cap section, and further comprising an inlet for quench oil and a liquid outlet at its lower end; (d) a pyrolysis furnace comprising a convection section, and a radiant section for cracking the vapor phase from the overhead vapor outlet to produce an effluent comprising olefins; (e) a means for quenching the effluent; and (f) a recovery train for recovering cracked product from the quenched effluent.

In yet another aspect, the present invention relates to a process for cracking a hydrocarbon feedstock containing resid, the process comprising: (a) heating the hydrocarbon feedstock; (b) mixing the heated hydrocarbon feedstock with a primary dilution steam stream to form a heated two-phase stratified open channel flow mixture stream, which may be further heated, e.g, by convection, prior to step (c); (c) directing the mixture stream to a vapor/liquid separation apparatus (or flash zone) for treating vapor/liquid mixtures of hydrocarbons and steam, the apparatus comprising: (i) a substantially cylindrical vertical drum having an upper cap section, a middle section comprising a substantially circular wall, and a lower cap section; (ii) an overhead vapor outlet attached to the upper cap section; (iii) at least one substantially tangentially positioned inlet in the wall of the middle section for introducing the flow along the wall; (iv) an annular structure located in the middle section, comprising A) an annular ceiling section extending from the circular wall and B) an internal vertical side wall to which the ceiling section extends, the side wall being positioned substantially concentrically to, but away from, the circular wall, the annular structure blocking the upward passage of the vapor/liquid mixtures along the circular wall beyond the ceiling section, and the annular structure preferably circumscribing an open core having sufficient cross-sectional area to permit vapor velocity low enough to avoid significant entrainment of liquid; and (v) a substantially concentrically positioned, substantially cylindrical boot of less diameter than the middle section, the boot communicating with the lower cap section, and further comprising an inlet for quench oil and a liquid outlet at its lower end; (d) removing the liquid phase through the liquid outlet of the vapor/liquid separation apparatus; (e) cracking the vapor phase in a radiant section of a pyrolysis furnace to produce an effluent comprising olefins, the pyrolysis furnace comprising a radiant section and a convection section; and (f) quenching the effluent and recovering cracked product therefrom.

DETAILED DESCRIPTION

The present invention relates to a highly efficient vapor/liquid separation apparatus for treating a flow of vapor/liquid mixtures of hydrocarbons and steam. The apparatus comprises a substantially cylindrical vertical drum or vessel having an upper cap section, a middle section comprising a circular wall, a lower cap section, a tangential inlet to introduce hydrocarbon/steam mixtures, an overhead vapor outlet, and a bottom outlet for liquid. The vessel also comprises an annular structure located in the middle section, comprising i) an annular ceiling section extending from the circular wall and ii) a concentric internal vertical side wall, to which the ceiling section extends. The annular structure blocks upward passage of vapor/liquid mixtures along the circular wall beyond the ceiling section, and surrounds an open core having sufficient cross-sectional area to permit vapor velocity low enough to avoid significant entrainment of liquid.

In one embodiment of the present invention, the vapor outlet comprises a pipe extending above and below the upper cap section of the drum, wherein a skirt extends circumferentially downwardly and outwardly from a section of the pipe extending below the upper cap section of the drum.

In another embodiment, the apparatus comprises an upper and a lower cap wherein the caps are at least one of i) substantially hemispherical and ii) substantially elliptical in longitudinal section.

In yet another embodiment, the tangentially positioned inlet passes through the circular wall and opens into the annular structure. The apparatus can further comprise an additional substantially tangentially positioned inlet substantially opposite from the first tangentially positioned inlet, or one or more such inlets equally spaced from one another along the vessel circumference. The tangential entry causes the liquid in the two-phase flow to contact the wall with significant force, e.g., from about 1 to 2 g's of centrifugal force. This permits hot liquid hydrocarbon to wet the wall and smoothly fall to the bottom of the vertical drum without being entrained by the gas flow in the core of the drum. Advantageously, the tangentially positioned inlet can be flush to an interior side of the circular wall, in order to reduce disruption of flow, the flush entry serving to reduce or eliminate formation of mist within the vessel. The resulting smooth, near vertical flow of the liquid to the bottom of the drum minimizes its residence time before quenching in the boot. Thus, the tangential inlet or inlets can serve to completely coalesce the liquid phase.

The apparatus of the present invention includes an open core defined by the annular structure. In one embodiment, the open core has sufficient cross-sectional area to permit vapor velocity of no greater than about one-third of the maximum vapor velocity, which avoids significant entrainment of liquid in the vapor. Typically, the open core has sufficient cross-sectional area to permit a vapor velocity of no greater than about 60 cm/sec (2 ft/sec), say, from about 15 to about 45 cm/sec (½ to 1½ ft/sec).

In an embodiment of the present invention, the tangentially positioned inlet is oriented to provide the flow in the same direction as the Coriolis force acting on the drum. Where more than one such inlet is present, all inlets are advantageously oriented to provide the flow in the same direction as the Coriolis force acting on the drum.

In one embodiment, it has been found useful to provide an apparatus according to the invention, which further comprises a means for controlling swirling of the liquid of the vapor/liquid mixture. While swirling can be unlimited in the present invention, typically, swirling is controlled to the extent that the liquid is swirled to no greater than about one-third of a revolution around the drum. The means for controlling swirling of the liquid is typically selected from at least one of i) limiting vapor/liquid velocity entering the drum and ii) providing a sufficient drum diameter. The vapor/liquid velocity entering the drum can be less than about 9 m/sec (30 ft/sec), preferably less than about 6 m/sec (20 ft/sec), preferably ranging from about 3 to about 6 m/sec (10 to 20 ft/sec). Sufficient drum diameters are typically greater than about 1 meter, e.g., greater than about 2 meters, e.g., about 4 meters.

In another embodiment of the present invention, a wear plate is attached to the circular wall adjacent the annular structure. The wear plate protects against erosion, particularly during decoking operations with air and steam in which coke can otherwise erode the interior wall of the flash vessel.

The apparatus of the present invention comprises an annular structure which serves to prevent trace mists from creeping up the drum walls. Inasmuch as a flat horizontal ring alone permits some mist to still creep up the walls and around the ring, the ring structure comprises a vertical element secured to the inner edge of the horizontal ring, providing an inverted L-shaped cross-section. Such a structure has been shown to prevent the mist from traversing the vertical element without coalescing into the bulk liquid phase. The annular structure is advantageously supported by hangers positioned above which reduces or prevents obstruction of fluid flows by the structure's supporting members.

In another embodiment, the apparatus comprises a manway provided in the circular wall, for the purpose of providing access to the interior of the flash drum for cleaning, maintenance and other servicing. The manway can comprise a plug contoured to the shape of the circular wall through which it passes.

As earlier noted, the apparatus of the present invention can further comprise at least one baffle located at a lower part of the middle section providing a surface slanting downwardly from the center of the drum toward the circular wall and providing a gap between the baffle and the circular wall for directing liquid along or near the circular wall to the lower cap section. In one embodiment, the baffle is perforated. This baffle, which can be substantially conical in shape, partially isolates the bottom of the flash drum and boot from the upper part of the flash drum, but prevents hot swirling vapors from causing liquid to swirl, and prevents the colder liquid in the boot from condensing the hotter vapor. The baffle advantageously is shaped, e.g., by having sufficient pitch where conical, to prevent pooling of liquid thereon. The baffle may also comprise perforations which improve mass transfer during decoking, e.g., by permitting passage of air and steam through the baffle. By properly selecting the number and size of the perforations, during normal operation, minimal hot vapor diffuses into the bottom of the drum. Yet, during decoking, the fraction of the steam/air mixtures flowing out the bottom of the boot can effectively contact the entire drum. Without perforations, a thick layer of coke can build on the lower part of the drum and on the baffle. Thus, the perforations are advantageously sufficient in size to prevent coke from plugging them. In one embodiment, the baffle is perforated with at least one of substantially circular perforations and substantially rectangular perforations. The baffle can be perforated with perforations ranging in size from about 50 to about 200 $cm^2$ (8 to 31 $in^2$). The perforations can have dimensions selected from the group consisting of about 5 cm×20 cm (2 in×8 in) rectangles and about 10 to 15 cm (4 to 6 in) diameter circles. Advantageously, the baffle is perforated to an extent ranging from about 1% to about 20% of its surface area as compared to a corresponding unperforated baffle, say, to an extent sufficient to increase mass transfer from the apparatus of a steam/air mixture used for decoking. Although a single baffle is typically used in the lower part of the middle section of the drum, multiple baffles may be used as well.

As earlier noted, the apparatus of the present invention comprises a substantially concentrically positioned, substantially cylindrical boot of less diameter than the middle section, the boot communicating with the lower cap section, and further comprising an inlet for quench oil and a liquid outlet at its lower end. The boot is the location at which hot liquid can be quenched by recycle of externally cooled liquid. The boot is advantageously sized to provide negligible liquid residence time before and during quenching, which prevents coke formation and provides a sufficient liquid level to be controllable. The liquid level also provides NPSH or Net Positive Suction Pressure to prevent cavitation in the pumps which serve to transfer liquid bottoms from the drum. The boot may comprise additional internal components to ensure that recycle quench is thoroughly and rapidly mixed with the hot liquid without causing vortexing of the liquid. Liquid vortices make the liquid level difficult to control and can allow gas to flow with the liquid into the pumps.

In one embodiment, the present invention relates to an apparatus wherein the boot further comprises an inlet for recycle quench oil. While quench can flow directly into the boot, this may cause liquid vortexing and a wavy gas/liquid interface.

In an embodiment of the present invention, it is especially desirable to provide the boot with a ring distributor for recycle quench oil, located at about the normal operating liquid level maintained in the boot. The ring distributor for recycle quench oil can advantageously comprise downwardly directed apertures to effect rapid quenching and a level gas/liquid interface. Sufficient number and size of the holes in the ring distributor ensure good flow distribution while plugging with coke.

In one embodiment, the apparatus of the present invention comprises a boot that further comprises anti-swirl baffles. Typically, the anti-swirl baffles comprise vanes whose longitudinal edges are substantially perpendicular to an internal wall of the boot, although any effective design is sufficient for present purposes.

In an embodiment, the apparatus contains a boot that further comprises at least one grate above and proximal to the liquid outlet. Such grate(s) prevent or minimize vortexing while liquid drains from the boot.

In still another embodiment, the present invention comprises an apparatus whose boot can comprise one or more additional drains for removing liquid, e.g., a side outlet above the liquid outlet. This can further prevent liquid from vortexing.

In an embodiment, the apparatus of the invention contains a boot that further comprises a side inlet for introducing fluxant. This is of particular utility because the liquid in the boot typically exhibits high viscosity as a result of high molecular weight or being partially visbroken. To promote flow of liquid hydrocarbon, the boot can be equipped with one or more nozzles for fluxant addition. Advantageously, the fluxant nozzle or nozzles can be located below the normal liquid level in the boot. Thus, fluxant can enter below the quench point, thereby preventing the fluxant from boiling.

In applying this invention, hydrocarbon feedstock containing resid may be heated by indirect contact with flue gas in a first convection section tube bank of the pyrolysis furnace before mixing with the fluid. Preferably, the temperature of the hydrocarbon feedstock is from about 150 to about 260° C. (300 to 500° F.) before mixing with the fluid.

The mixture stream may then be heated by indirect contact with flue gas in a first convection section of the pyrolysis furnace before being flashed. Preferably, the first convection section is arranged to add the fluid, and optionally primary dilution steam, between passes of that section such that the hydrocarbon feedstock can be heated before mixing with the fluid and the mixture stream can be further heated before being flashed.

The temperature of the flue gas entering the first convection section tube bank is generally less than about 815° C. (1500° F.), for example, less than about 700° C. (1300° F.), such as less than about 620° C. (1150° F.), and preferably less than about 540° C. (1000° F.). Dilution steam may be added at any point in the process, for example, it may be added to the hydrocarbon feedstock containing resid before or after heating, to the mixture stream, and/or to the vapor phase. Any dilution steam stream may comprise sour steam or process steam.

Sour steam is dilution steam made downstream of furnaces in the first distillation tower called the primary fractionator. In the primary fractionator heat is removed from the process by boiling condensed dilution steam. The condensed dilution steam can thus contain some sulfur species and acids that were in the feed or a cracked by-product. Hence the condensed dilution steam smells sour. To prevent corrosion in the process boiler where the condensed dilution steam is revaporized, chemicals are added to raise the pH. So, when the condensed dilution steam is revaporized it is less malodorous and is referred to as process steam. Process steam is made within the equipment that also handles the cracked products. Clean steam is made in the utility section of the plant from clean water, also known as boiler feed water.

Any dilution steam stream may be heated or superheated in a convection section tube bank located anywhere within the convection section of the furnace, preferably in the first or second tube bank.

The mixture stream may be at about 315 to about 540° C. (600° F. to 1000° F.) before the flash step, and the flash pressure may be about 275 to about 1375 kPa (40 to 200 psia). Following the flash, 50 to 98% of the mixture stream may be in the vapor phase. An additional separator such as a centrifugal separator located downstream of the vapor outlet from the drum may be used to remove trace amounts of liquid from the vapor phase. The vapor phase may be heated to above the flash temperature before entering the radiant section of the furnace, for example, from about 425 to about 705° C. (800 to 1300° F.). This heating may occur in a convection section tube bank, preferably the tube bank nearest the radiant section of the furnace.

Unless otherwise stated, all percentages, parts, ratios, etc. are by weight. Unless otherwise stated, a reference to a compound or component includes the compound or component by itself, as well as in combination with other compounds or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless whether ranges are separately disclosed.

Also as used herein:

Flow regimes are visual or qualitative properties of fluid flow. There is no set velocity and no set drop size. Mist flow refers to a two-phase flow where tiny droplets of liquid are dispersed in the vapor phase flowing through a pipe. In clear pipe, mist flow looks like fast moving small rain droplets.

Annular flow refers to a two-phase flow where liquid flows as streams on the inside surface of a pipe and the vapor flows in the core of the pipe. The vapor flow velocity of annular flow is about 6 m/s (20 feet/second). In clear pipe, a layer of fast moving liquid is observed. Few droplets of liquid are observed in the core of the vapor flow. At the pipe exit, the liquid usually drips out and only a small amount of mist is observed. The change from mist to annular flow usually includes a transition period where mist and annular flow exist together.

The feedstock comprises at least two components: volatile hydrocarbons and non-volatile hydrocarbons. The mist flow, in accordance with the present invention, comprises fine droplets of non-volatile hydrocarbons entrained in volatile hydrocarbon vapor.

Figure 1:
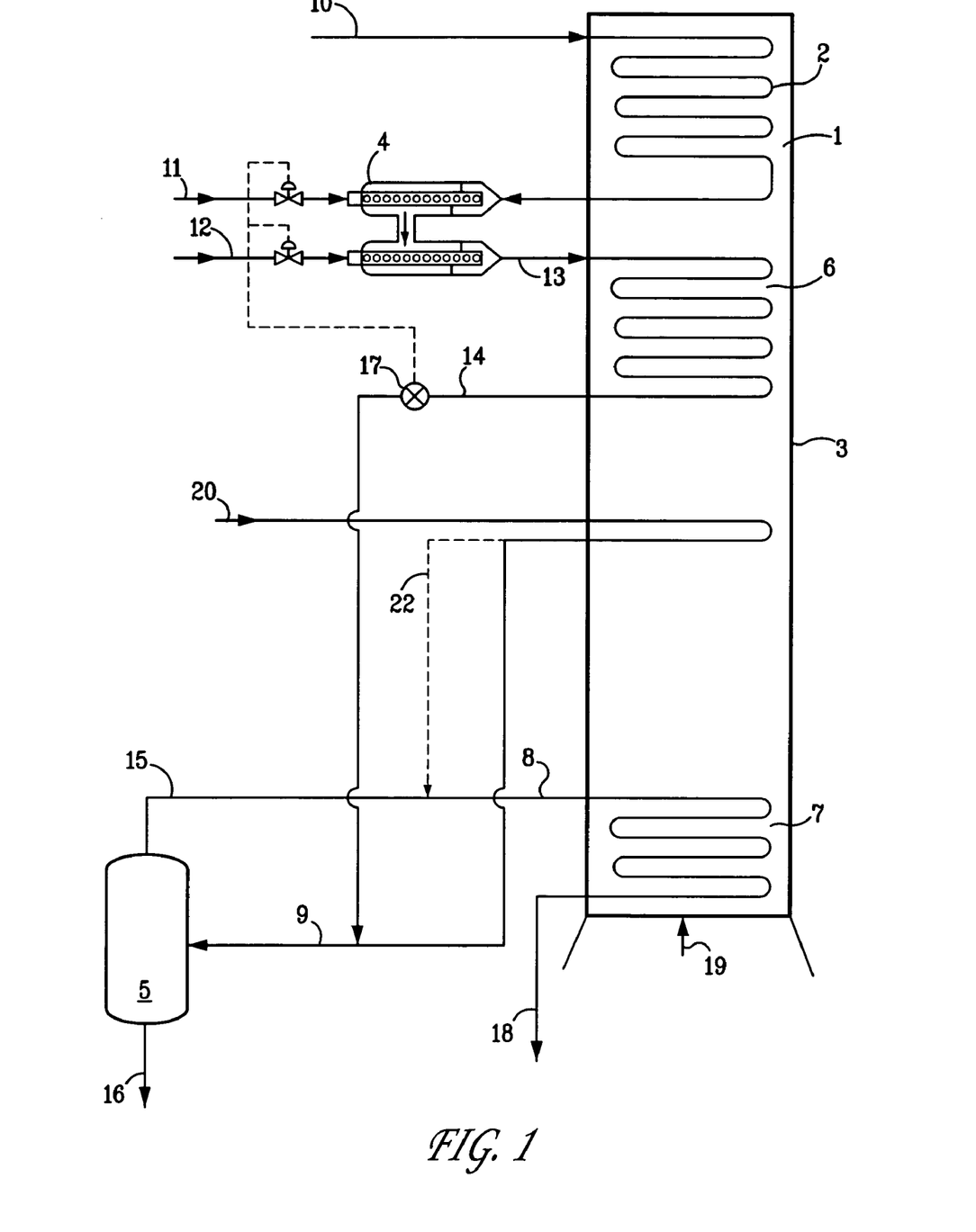
FIG. 1 illustrates a schematic flow diagram of a process in accordance with the present invention employed with a pyrolysis furnace.

A process for cracking a hydrocarbon feedstock 10 of the present invention as illustrated in FIG. 1 comprises preheating a hydrocarbon feedstock by a bank of exchanger tubes 2, with or without the presence of water 11 and steam 12 in the upper convection section 1 of a steam cracking furnace 3 to vaporize a portion of the feedstock and to form a mist stream 13 comprising liquid droplets comprising non-volatile hydrocarbons in volatile hydrocarbon/steam vapor. The further preheating of the feedstock/water/steam mixture can be carried out through a bank of heat exchange tubes 6. The mist stream upon leaving the convection section 14 has a first flow velocity and a first flow direction. The process also comprises treating the mist stream to coalesce the liquid droplets, separating at least a portion of the liquid droplets from the hydrocarbon vapor in a flash 5 to form a vapor phase 15 and a liquid phase 16, and feeding the vapor phase 8 to the lower convection section 7 and thence by crossover piping 18 to the radiant section of the cracking furnace 3.

Flue gas from the radiant section is introduced to the lower convection section 7 of furnace 3 via 19.

As used herein, non-volatile components, or resids, are the fraction of the hydrocarbon feed with a nominal boiling point above 590° C. (1100° F.) as measured by ASTM D-6352-98 or D-2887. This invention works very well with non-volatiles having a nominal boiling point above 760° C. (1400° F.). The boiling point distribution of the hydrocarbon feed is measured by Gas Chromatograph Distillation (GCD) by ASTM D-6352-98 or D-2887 extended by extrapolation for materials boiling above 700° C. (1292° F.). Non-volatiles include coke precursors, which are large, condensable molecules that condense in the vapor, and then form coke under the operating conditions encountered in the present process of the invention.

The hydrocarbon feedstock can comprise a large portion, such as about 0.3 to about 50%, of non-volatile components. Such feedstock could comprise, by way of non-limiting examples, one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams including wide bottoms, wide boiling range naphtha to gas oil condensates, heavy non-virgin hydrocarbon streams from refineries, vacuum gas oils, heavy gas oil, naphtha contaminated with crude, atmospheric residue, heavy residue, C4's/residue admixture, naphtha/residue admixture, hydrocarbon gases/residue admixtures, hydrogen/residue admixtures, gas oil/residue admixture, and crude oil.

The hydrocarbon feedstock can have a nominal end boiling point of at least about 315° C. (600° F.), generally greater than about 510° C. (950° F.), typically greater than about 590° C. (1100° F.), for example greater than about 760° C. (1400° F.). The economically preferred feedstocks are generally low sulfur waxy residues, atmospheric residues, naphthas contaminated with crude, various residue admixtures and crude oils.

As noted, the heavy hydrocarbon feedstock is preheated in the upper convection section of the furnace 1. The feedstock may optionally be mixed with steam before preheating or after preheating (e.g., preferably after preheater 2 in a sparger 4). The preheating of the heavy hydrocarbon can take any form known by those of ordinary skill in the art. It is preferred that the heating comprises indirect contact of the feedstock in the convection section of the furnace with hot flue gases from the radiant section of the furnace. This can be accomplished, by way of non-limiting example, by passing the feedstock through a bank of heat exchange tubes 2 located within the upper convection section 1 of the pyrolysis furnace 3. The preheated feedstock 14 before the control system 17 has a temperature between about 310 and about 510° C. (600 to 950° F.). Preferably, the temperature of the heated feedstock is between about 370 and about 490° C. (700 to 920° F.), more preferably between about 400 and about 480° C. (750 to 900° F.) and most preferably between about 430 and about 475° C. (810 to 890° F.).

As a result of preheating, a portion of the feedstock is vaporized and a mist stream is formed containing liquid droplets comprising non-volatile hydrocarbon in volatile hydrocarbon vapor, with or without steam. At flow velocities of greater than about 30 meters/second (100 feet/second), the liquid is present as fine droplets comprising non-volatile hydrocarbons entrained in the vapor phase. This two-phase mist flow is extremely difficult to separate into liquid and vapor. It is necessary to coalesce the fine mist into large droplets or a single continuous liquid phase before entering the flash drum. However, flow velocities of about 30 m/sec (100 ft/sec) or greater are normally necessary to practically effect the transfer of heat from the hot flue gases and reduce coking, especially in lower convection section 7 and/or further downstream.

In an embodiment of the present invention, the mist stream is treated in accordance with the method disclosed in earlier noted US2004/004028 to coalesce the liquid droplets. In one embodiment in accordance with the present invention, the treating comprises reducing the velocity of the mist stream. It is found that reducing the velocity of the mist stream leaving convection section 14 before the flash 5 (location 9 in FIG. 1) helps coalesce the mist stream. It is preferred to reduce the mist stream velocity by at least about 40%, preferably at least about 70%, more preferably at least about 80%, and most preferably about 85%. It is also preferred to reduce the velocity of the mist flow stream leaving the convection section from at least about 30 m/sec (100 feet/sec) to a velocity of less than about 18 m/sec (60 feet/sec), more preferably to less than about 9 m/sec (30 feet/sec), and most preferably to less than about 6 m/sec (20 feet/sec).

It is found that using the invention disclosed herein, a flash drum removal efficiency of at least about 95% can be accomplished. A preferred flash efficiency of at least about 98%, a more preferred flash efficiency of at least about 99%, and a most preferred flash efficiency of at least about 99.9% can also be achieved using the present invention.

After the desirable reduction of velocity, e.g., in a combination of expanders, the fine droplets in the mist flow stream can advantageously coalesce in one or more bends and thus are easily separated from the vapor phase stream in the flash drum 5. Flash is normally carried out in at least one flash drum. In the flash drum 5, the vapor phase stream is removed from at least one upper flash drum outlet 15 and the liquid phase is removed from at least one lower flash drum outlet 16. Preferably, two or more lower flash drum outlets are present in the flash for liquid phase removal.

Secondary dilution steam 20 can be convection heated in the furnace 3 and then directed to the flash drum 5 via line 9. In one embodiment, the heated secondary dilution steam can be added directly to the flash drum 5 via line 9. Alternately, the heated secondary dilution steam can be added to the flash drum overhead by an optional bypass 22.

Figure 2:
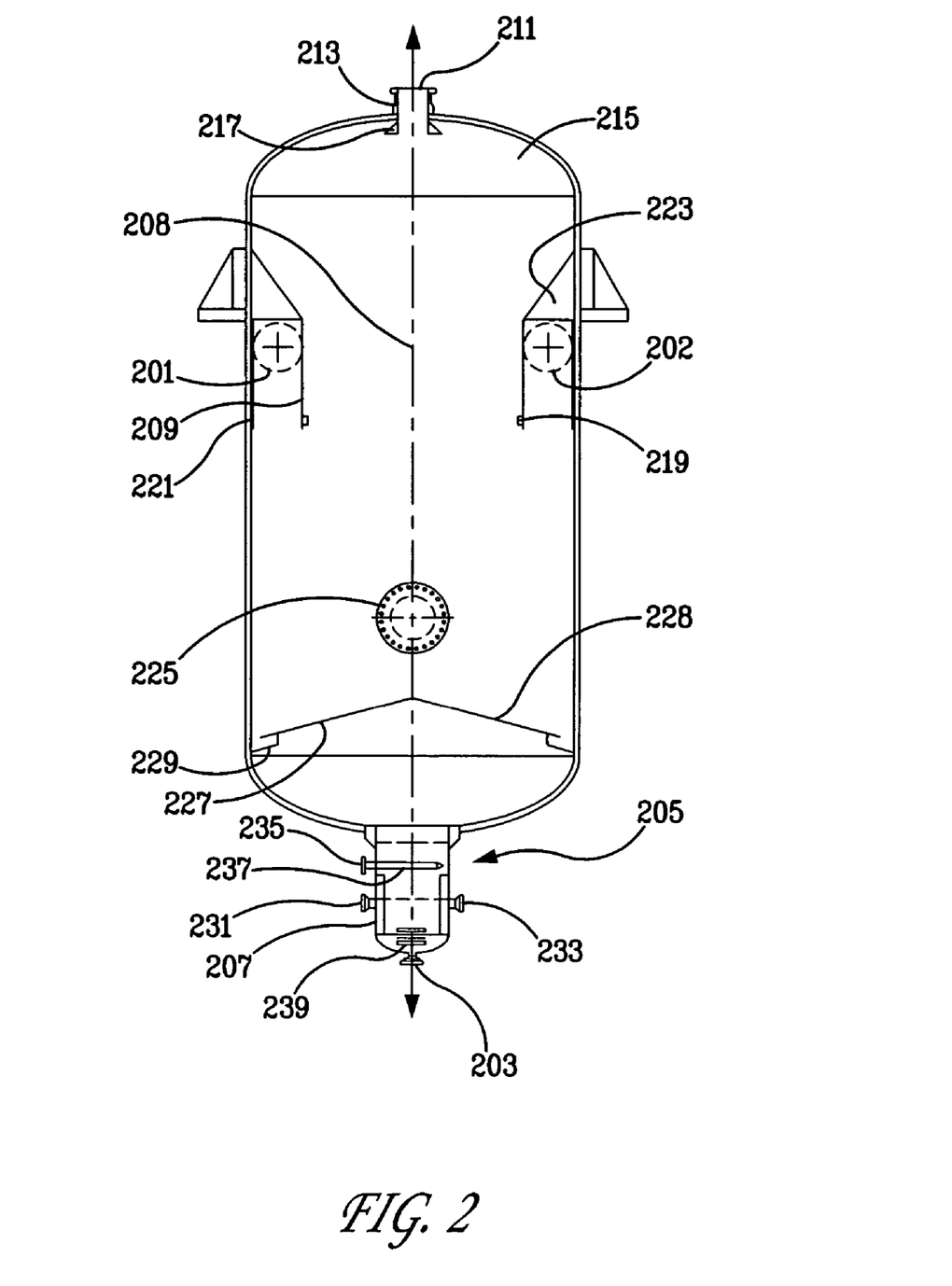
FIG. 2 illustrates an elevational view of an embodiment of the flash/separation apparatus of the present invention comprising tangential inlets, annular, inverted-L baffle, perforated conical baffle, manway, boot with anti-swirl baffles and ring distributor.

To further increase the removal efficiency of the non-volatile hydrocarbons in the flash drum (or vapor/liquid separation apparatus), it is preferred that the flash stream 9 of FIG. 1 enters the flash drum tangentially through tangential flash drum inlet 201 and 202 as shown in FIG. 2. Preferably, the tangential inlets are level or of slightly downward flow. The non-volatile hydrocarbon liquid phase will form an outer annular flow along the inside flash drum wall and the volatile vapor phase will initially form an inner core and then flow upwardly in the flash drum. In one preferred embodiment, the tangential entries should be of the same direction as the Coriolis effect.

The liquid phase is removed from bottom flash drum outlet 203 attached to boot 205. Optionally, a side flash drum outlet 231 or a vortex breaker comprising anti-swirl baffles or vanes 207 can be added to prevent a vortex forming in the outlet. The upward inner core flow of vapor phase is diverted in the middle section 208 around an annular structure or baffle 209 inside the flash drum and is removed from at least one upper flash drum outlet or overhead vapor outlet 211 which can comprise a pipe 213 extending above and below the upper cap portion 215 of the drum which is typically semi-elliptical in longitudinal section. The baffle or annular structure 209 is installed inside the flash drum to further avoid and reduce any portion of the separated liquid phase, flowing downwards in the flash drum, from being entrained in the upflow vapor phase in the flash drum. The pipe 213 may have a skirt 217 extending circumferentially down and out from a lower section of the pipe. A stiffening ring 219 is attached to the lower internal portion of the annular structure 209 for reinforcement. A wear plate 221 is optionally provided around the internal drum wall partially enclosed by the annular structure for the purpose of preventing erosion of the internal drum wall by coke during decoking. A support structure 223 may be used to attach the annular structure 209 to the drum from above. An optional manway 225 is provided in the drum wall to provide access to the drum internals. A conical baffle 227 having sufficient pitch to prevent liquid from pooling on its surface is optionally located in the lower portion of the drum vessel, e.g., beneath the manway. Conical baffle 227 can be supported by columns or brackets 229 attached to the drum wall. A baffle manway 228 optionally provides access through the conical baffle. Boot 205 may optionally comprise a side outlet 231 that permits withdrawal of liquid bottoms while avoiding the swirling flow problems associated with using only the bottom liquid outlet 203. The boot 205 may further comprise an inlet 233 for liquid fluxant added to control viscosity, as well as an inlet for quench oil 235 in communication with ring distributor 237. The boot may also comprise anti-vortex subway grating 239. The vapor phase, preferably, flows to the lower convection section 7 of FIG. 1 and through crossover pipes 18 to the radiant section of the pyrolysis furnace.

Figure 3:
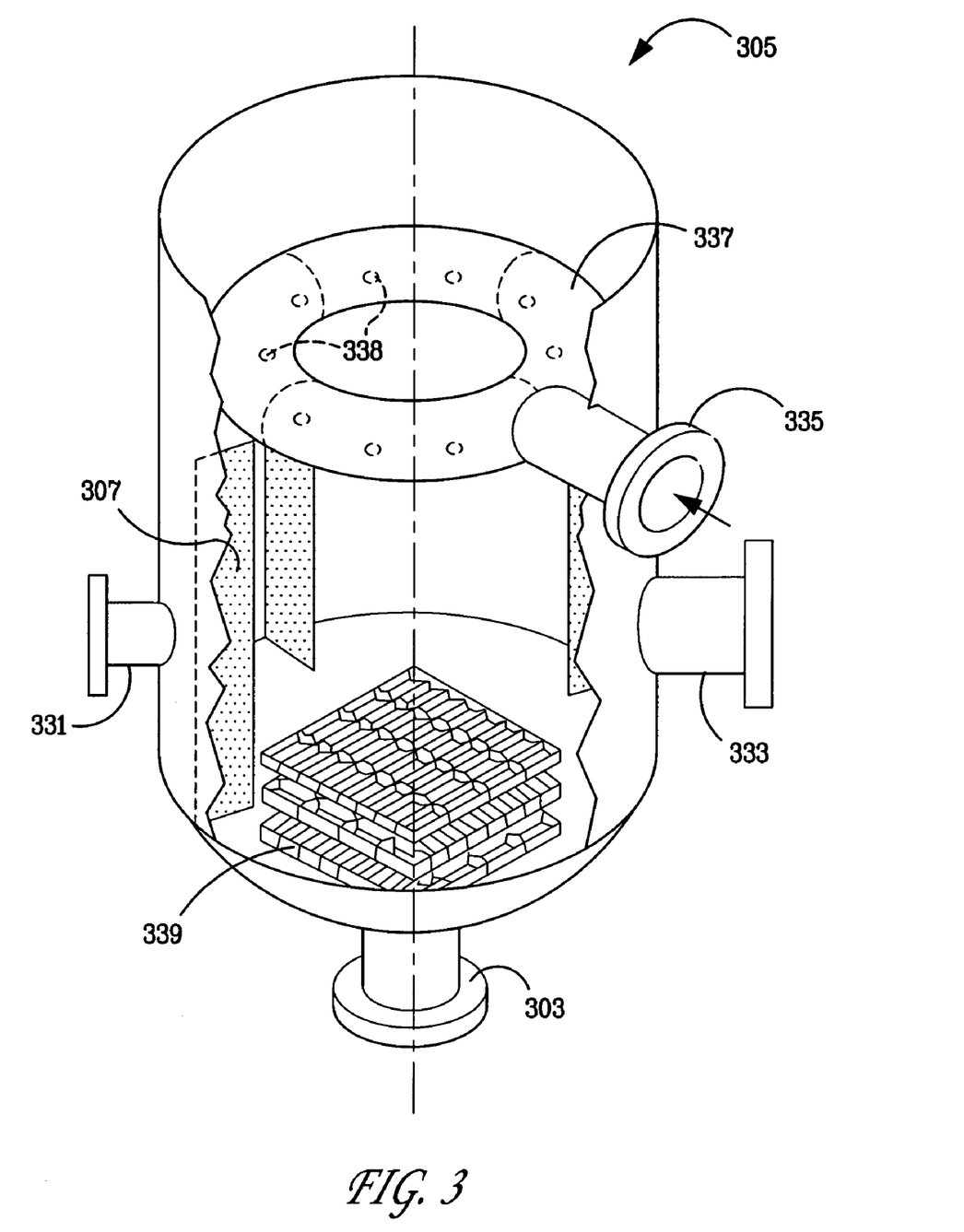
FIG. 3 provides a perspective detailed view of a boot for an embodiment of the present invention, depicting an inlet for quench oil and associated ring distributor, an inlet for fluxant, a side drain and anti-swirl baffles.

Referring to FIG. 3, a perspective detailed view of a boot 305 shows a bottom resid liquid outlet 303, anti-swirl baffle's 307, a side drain 331, a fluxant inlet 333, a quench oil inlet 335 attached to ring distributor 337 having downwardly pointed holes 338, and anti-vortex subway grating 339.

Figure 4:
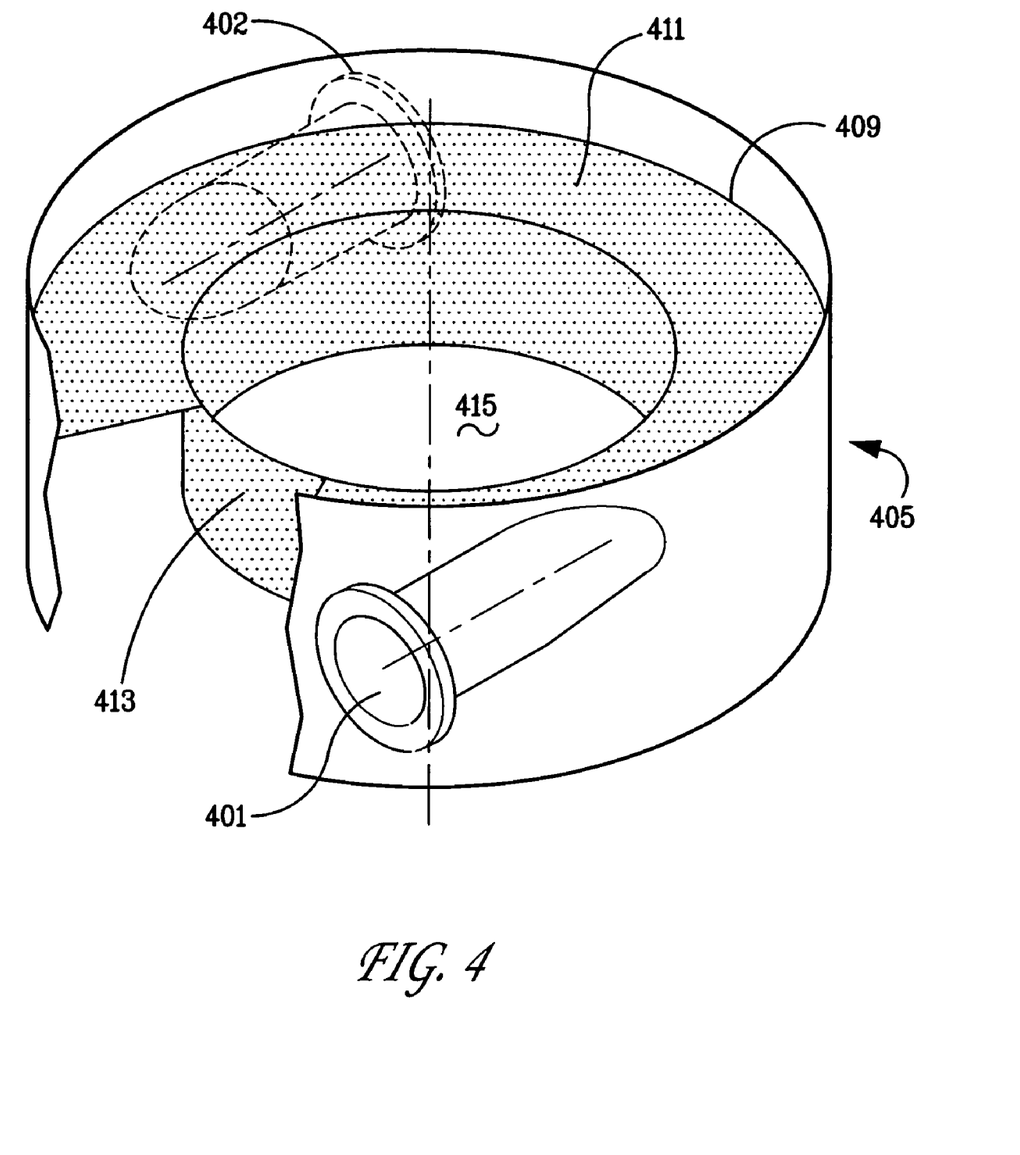
FIG. 4 provides a perspective view of a cross-section of the apparatus taken at the level of the tangential inlet nozzles showing the details of the annular, inverted-L baffle.

Referring to FIG. 4, a perspective detailed view, including a cut-away, of a cross-section of the vapor/liquid separation apparatus or flash drum 405 taken at the level of the tangential inlet nozzles 401 and 402 shows the details of the annular structure 409, comprising a horizontal annular ring component or annular ceiling section 411 extending from the circular wall of the flash drum 405, and an internal vertical side wall 413, providing an inverted-L shaped profile as shown by the cut-away. An open core area 415 allows upward flow of the vapor phase to the overhead or vapor outlet 211 shown in FIG. 2.

Figure 5:
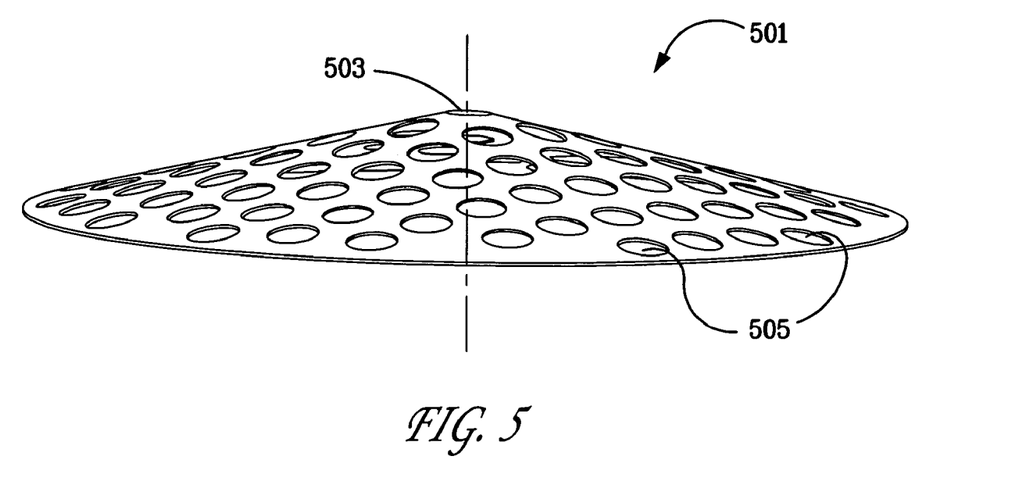
FIG. 5 provides a perspective view of a perforated conical baffle used in an embodiment of the present invention.

Referring to FIG. 5, a perspective view is provided of a perforated conical baffle 501 having an apex 503 used in an embodiment of the present invention, which includes perforations 505 of round or elliptical shape.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A vapor/liquid separation apparatus for treating a flow of vapor/liquid mixtures of hydrocarbons and steam, comprising:
   (a) a substantially cylindrical vertical drum having an upper cap section, a middle section comprising a circular wall, and a lower cap section;
   (b) an overhead vapor outlet attached to said upper cap section;
   (c) at least one substantially tangentially positioned inlet in the circular wall of said middle section for introducing said flow along said wall;
   (d) an annular structure located in the middle section, comprising i) an annular ceiling section extending from the circular wall and ii) an internal vertical side wall to which said ceiling section extends, said side wall being positioned substantially concentrically to, but away from, said circular wall, said annular structure blocking the upward passage of said vapor/liquid mixtures along the circular wall beyond said ceiling section, and said annular structure surrounding an open core having sufficient cross-sectional area to permit vapor velocity low enough to avoid significant entrainment of liquid; and
   (e) a substantially concentrically positioned, substantially cylindrical boot of less diameter than said middle section, said boot communicating with said lower cap section, and further comprising a liquid outlet at its lower end.

2. The apparatus of claim 1 which further comprises: (f) at least one baffle located at a lower part of said middle section providing a surface slanting downwardly from the center of said drum toward the circular wall and providing a gap between said baffle and said circular wall for directing liquid along or near the circular wall to said lower cap section.

3. The apparatus of claim 1 wherein said vapor outlet comprises a pipe extending above and below said upper cap section of said drum, wherein a skirt extends circumferentially downwardly and outwardly from a section of said pipe extending below the upper cap section of said drum.

4. The apparatus of claim 1 wherein said caps are at least one of substantially hemispherical and substantially elliptical in longitudinal section.

5. The apparatus of claim 1 wherein said tangentially positioned inlet passes through said circular wall and opens into said annular structure.

6. The apparatus of claim 5 further comprising an additional tangentially positioned inlet substantially opposite from the first tangentially positioned inlet.

7. The apparatus of claim 5 wherein said tangentially positioned inlet is flush to an interior side of said circular wall.

8. The apparatus of claim 4 which further comprises a means for controlling swirling of the liquid of said vapor/liquid mixture to no greater than about one-third of a revolution around said drum.

9. The apparatus of claim 8 wherein said means for controlling swirling of the liquid is selected from i) limiting vapor/liquid velocity entering the drum and ii) providing a sufficient drum diameter.

10. The apparatus of claim 1 wherein said tangentially positioned inlet is oriented to provide said flow in the same direction as the Coriolis force acting on said drum.

11. The apparatus of claim 1 wherein a wear plate is attached to the circular wall adjacent said annular structure.

12. The apparatus of claim 1 wherein said annular structure is supported by hangers positioned above said annular structure.

13. The apparatus of claim 1 wherein a manway is provided in the circular wall.

14. The apparatus of claim 13 wherein said manway comprises a plug contoured to the shape of the circular wall through which it passes.

15. The apparatus of claim 2 wherein said baffle is perforated.

16. The apparatus of claim 2 wherein said baffle is perforated with at least one of substantially circular perforations and substantially rectangular perforations.

17. The apparatus of claim 15 wherein said baffle is perforated with perforations ranging in size from about 50 to about 200 $cm^2$ (8 to 31 $in^2$).

18. The apparatus of claim 16 wherein said perforations can have dimensions selected from the group consisting of about 5 cm×20 cm (2 in×8 in) rectangles and about 10 to 15 cm (4 to 6 in) diameter circles.

19. The apparatus of claim 2 wherein said baffle is perforated to an extent ranging from about 1% to about 20% of its surface area as compared to a corresponding unperforated baffle.

20. The apparatus of claim 2 wherein said baffle is perforated to an extent sufficient to increase mass transfer from said apparatus of a steam/air mixture used for decoking.

21. The apparatus of claim 2 wherein said baffle is substantially conical.

22. The apparatus of claim 2 wherein said baffle is pitched to an extent sufficient to prevent liquid from pooling thereon during operation of said apparatus.

23. The apparatus of claim 2 comprising two or more of said baffles.

24. The apparatus of claim 1 wherein said boot further comprises an inlet for recycle quench oil.

25. The apparatus of claim 1 wherein said boot further comprises a ring distributor for recycle quench oil, located at about the normal operating liquid level maintained in said boot.

26. The apparatus of claim 25 wherein said ring distributor for recycle quench oil comprises downwardly directed apertures.

27. The apparatus of claim 1 wherein said boot further comprises anti-swirl baffles.

28. The apparatus of claim 27 wherein said anti-swirl baffles comprise vanes whose longitudinal edges are substantially perpendicular to an internal wall of the boot.

29. The apparatus of claim 1 wherein said boot further comprises at least one grate above and proximal to said liquid outlet.

30. The apparatus of claim 1 wherein said boot further comprises a side outlet above said liquid outlet.

31. The apparatus of claim 1 wherein said boot further comprises a side inlet for introducing fluxant.

32. The apparatus of claim 31 wherein said side inlet is located below the normal liquid level maintained in the boot during operation.

33. The apparatus of claim 1 wherein said open core has sufficient cross-sectional area to permit vapor velocity of no greater than about one-third of the maximum vapor velocity which avoids significant entrainment of liquid.

34. The apparatus of claim 33 wherein said open core has sufficient cross-sectional area to permit a vapor velocity of no greater than about 60 cm/sec (2 ft/sec).

* * * * *